United States Patent
Makino

(10) Patent No.: US 7,916,785 B2
(45) Date of Patent: Mar. 29, 2011

(54) IMAGE PROCESSING APPARATUS AND METHOD

(75) Inventor: Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1458 days.

(21) Appl. No.: 11/345,427

(22) Filed: Feb. 1, 2006

(65) Prior Publication Data

US 2006/0171680 A1     Aug. 3, 2006

(30) Foreign Application Priority Data

Feb. 2, 2005   (JP) ................................ 2005-026881

(51) Int. Cl.
*H04N 7/12* (2006.01)
(52) U.S. Cl. ......... 375/240.12; 375/240.01; 348/384.01; 348/394.01; 348/402.01
(58) Field of Classification Search ............. 375/240.12, 375/240.01; 348/384.1, 394.1, 402.1
See application file for complete search history.

(56) References Cited

U.S. PATENT DOCUMENTS 5,943,469 A * 8/1999 Enokida ............ 348/390.1
6,775,326 B2   8/2004 Sekiguchi et al.

FOREIGN PATENT DOCUMENTS

JP   2004-088801 A   3/2004
JP   2005-005844     1/2005

* cited by examiner

*Primary Examiner* — Mohammad H Ghayour
*Assistant Examiner* — Leila Malek
(74) *Attorney, Agent, or Firm* — Cowan, Liebowitz & Latman, P.C.

(57) ABSTRACT

This invention provides a coding method and apparatus capable of increasing the coding efficiency. According to this invention, an image processing apparatus which performs predictive coding using image data of a different frame as a reference picture includes a prediction unit which performs motion compensated prediction for each reference picture in at least one reference list formed from a set of reference pictures for prediction, a reference list update unit which updates the reference list by adding or deleting the reference picture, a reference counter unit which measures, for each reference picture, a count at which the reference picture is used for motion compensation predictive coding, and an update picture determination unit which determines a reference picture to be updated in the reference list by using the measurement result of the reference counter unit.

13 Claims, 13 Drawing Sheets

IMAGE PROCESSING APPARATUS AND METHOD

FIELD OF THE INVENTION

The present invention relates to an apparatus and method which compress and record image data and, more particularly, to an apparatus and method which compress image data using MPEG-4 part-10: AVC (ISO/IEC 14496-10, also called H.264).

BACKGROUND OF THE INVENTION

Various methods of compressing and recording image data have conventionally been proposed. There is newly proposed MPEG-4 part-10: AVC (ISO/IEC 14496-10, also called H.264) (to be referred to as H.264 hereinafter).

An H.264 compression procedure will be explained with reference to FIG. 7. In FIG. 7, input image data is divided into macroblocks. A difference from a predicted value is obtained by a subtracter 701, undergoes integer DCT transform by a transformer 702, and is quantized by a quantizer 703. The quantized data is sent as difference image data to an entropy encoder 715.

At the same time, the quantized data is dequantized by a dequantizer 704, and undergoes inverse integer DCT transform by an inverse transformer 705. A predicted value is added to the resultant data by an adder 706 to reconstruct an image. The reconstructed image is sent to a frame memory 707 for intra prediction. At the same time, the reconstructed image is supplied to a deblocking filter 709, undergoes deblocking filter processing, and then sent to a frame memory 710 for inter prediction.

An image for intra prediction that is stored in the frame memory 707 is used for intra prediction by an intra prediction circuit 708. In intra prediction, the value of an adjacent pixel of an encoded block in the same picture is used as a predicted value.

An image for inter prediction that is stored in the frame memory 710 is made up of a plurality of pictures, which will be described later. Prediction pictures are classified into two lists List_0 and List_1, and used for inter prediction by an inter prediction circuit 711.

After prediction, images in the frame memory 710 are updated by a memory controller 713. In inter prediction, a motion detector 712 executes motion detection for image data of a different frame to obtain an optimal motion vector. A predicted image is determined using the optimal motion vector. As a result of intra prediction and inter prediction, an optimal prediction is selected by a switching circuit 714. An intra prediction mode or predicted value is supplied to the entropy encoder (e.g., variable-length encoder) 715, and encoded together with difference image data to form an output bitstream. An outline of the H.264 compression procedure has been described, and its contents are disclosed in detail in a standard specification. Other prior art references which disclose H.264 compression procedures also exist (see, e.g., Japanese Patent Laid-Open No. 2005-5844).

Next, H.264 inter prediction will be explained in detail with reference to FIGS. 8 to 11. In H.264 inter prediction, a plurality of pictures can be used for prediction. Two lists (List_0 and List_1) are prepared to specify a reference picture. Five reference pictures can be assigned to each list at maximum.

For P pictures, only List_0 is used to mainly perform forward prediction. For B pictures, List_0 and List_1 are used to perform bidirectional prediction (or only forward or only backward prediction). That is, pictures mainly for forward prediction are assigned to List_0, and pictures mainly for backward prediction are contained in List_1.

FIG. 8 shows an example of a reference list in coding. In FIG. 8, reference numeral 801 denotes image data which are arranged in the display order. Each rectangle shows the type of picture and a number representing the display order. I15 is an I picture whose display order is 15, and undergoes only intra prediction. P18 is a P picture whose display order is 18, and undergoes only forward prediction. B16 is a B picture whose display order is 16, and undergoes bidirectional prediction. The coding order is different from the display order, and data are encoded in the prediction order. In FIG. 8, data are coded in the order of I15, P18, B16, B17, P21, B19, B20, . . . . Reference numeral 802 denotes a reference list (List_0) which contains temporarily encoded/decoded pictures. For example, when inter prediction is performed using a picture P21 (P picture whose display order is 21), pictures which have been encoded and decoded in the list are referred to. In this example, P06, P09, P12, I15, and P18 are contained in the list. In inter prediction, a motion vector having an optimal predicted value is obtained from reference pictures in the list, and encoded for each macroblock. Pictures in the list are sequentially given reference picture numbers (separately from numbers shown in FIG. 8), and discriminated from each other After the end of encoding P21, P21 is newly decoded and added to the reference list. The oldest reference picture (in this case, P06) is deleted from the reference list. Coding proceeds for B19, B20, and P24. FIG. 9 shows the state of the reference list at this time.

FIG. 10 shows a change of the reference list for each picture. In FIG. 10, pictures during coding and the contents of List_0 and List_1 are shown from top to bottom in the order of pictures to be encoded.

When a P picture (or I picture) is encoded as shown in FIG. 10, the reference list is updated to delete the oldest picture from the list. In this example, List_1 has only one picture in order not to refer to excessively distant backward pictures because backward reference of many pictures increases the buffer amount till decoding.

In this example, pictures used for reference are I and P pictures, which are sequentially added to the reference list.

In List_1, the number of pictures used for backward prediction is only one. This is merely an example of the picture structure which is supposed to be a most-used one. H.264 itself has a high degree of freedom by the configuration of the reference list. For example, not all I and P pictures need be added to the reference list, and B pictures can also be added to the reference list. Further, a long-term reference list which keeps pictures in the reference list till reception of an explicit instruction is also defined. FIG. 11 shows a change of the reference list when no picture P24 is used in the reference list.

FIG. 12 shows a state in which a macroblock of 16×16 pixels can be divided into finer macroblock partitions in H.264 inter prediction. For the divided macroblock partitions, motion vectors can be obtained by referring to independent reference pictures. An 8×8 macroblock partition can be divided into finer sub-macroblock partitions. The sub-macroblock partitions refer to the same reference picture, but their motion vectors are independently obtained. A configuration capable of changing the block size of motion compensation is also shown in FIG. 27 in Japanese Patent Laid-Open No. 2005-5844.

The H.264 standard defines the structure and update method of the reference list and the like, but does not specify a reference picture to be updated and its update time. Even a picture of a high reference frequency in the reference list may be deleted in update only because it is an old picture.

For example, as shown in FIG. 13, when a picture P21 is to be encoded, a picture P09 in the reference list is abnormal (for example, it is an image instantaneously when the flash emits light), and less used for prediction, and an older picture P06 is referred to more frequently. Even in this case, the oldest picture P06 is deleted in updating the list, and the less referred picture P09 remains. The number of substantially referred pictures decreases in the reference list, and the coding efficiency cannot be maximized.

SUMMARY OF THE INVENTION

The present invention has been made to solve the conventional problems, and has as its object to provide a coding method and apparatus capable of increasing the coding efficiency.

To solve the above problems, according to the first aspect of the present invention, an image processing apparatus which performs predictive coding using image data of a different frame as a reference picture is characterized by comprising prediction means for performing motion compensated prediction for each reference picture in at least one reference list formed from a set of reference pictures for prediction, reference list update means for updating the reference list by adding or deleting the reference picture, reference counter means for measuring, for each reference picture, a count at which the reference picture is used for motion compensation predictive coding, and update picture determination means for determining a reference picture to be updated in the reference list by using a measurement result of the reference counter means.

According to the second aspect of the present invention, an image processing method of performing predictive coding using image data of a different frame as a reference picture is characterized by comprising a prediction step of performing motion compensated prediction for each reference picture in at least one reference list formed from a set of reference pictures for prediction, a measurement step of measuring, for each reference picture, a count at which the reference picture is used for motion compensated prediction, an update picture determination step of determining a reference picture to be updated from the reference list by using a measurement result in the measurement step, and a reference list update step of updating the reference list on the basis of a determination result in the update picture determination step.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

First Embodiment

Figure 1:
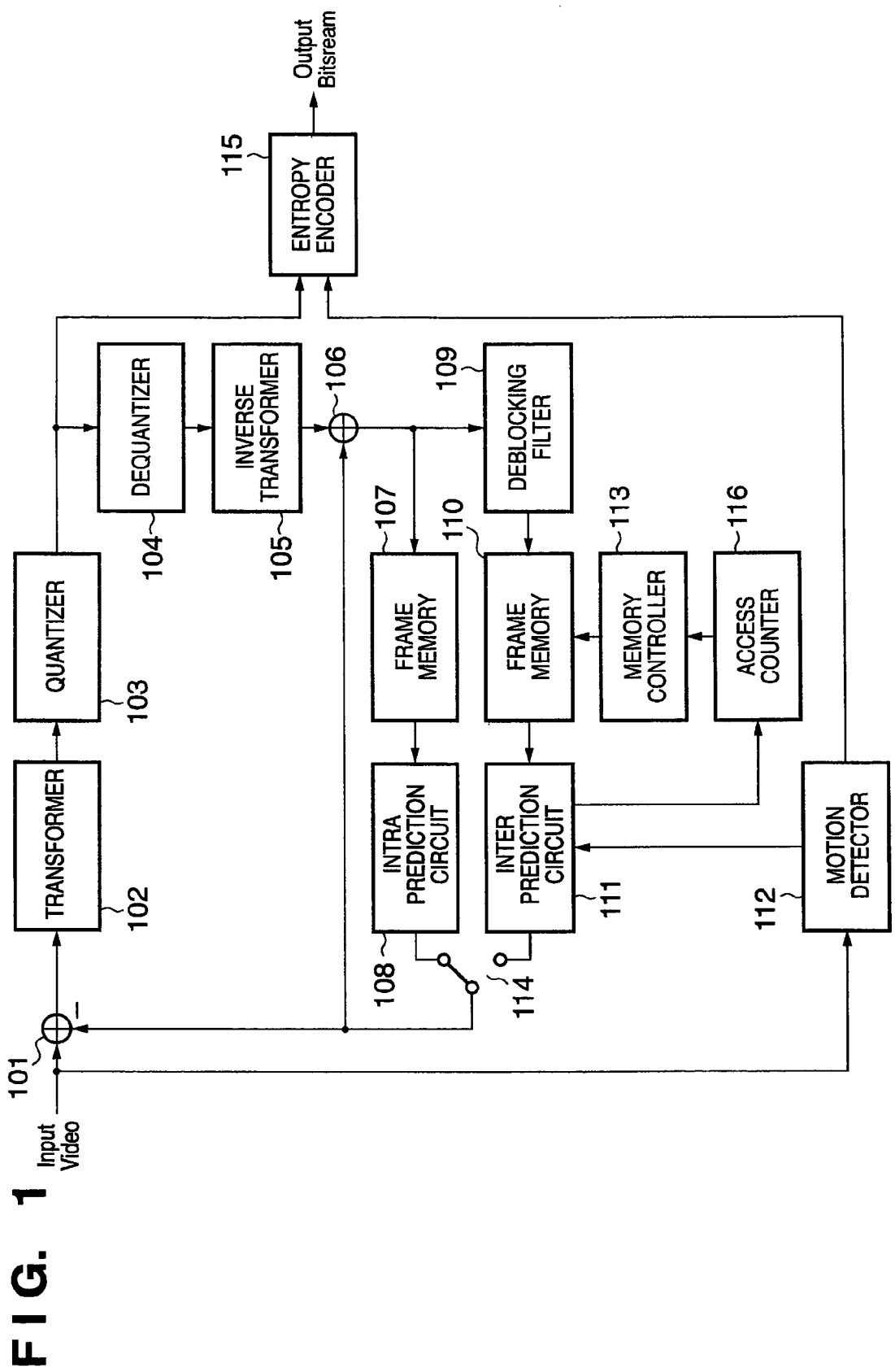
FIG. 1 is a block diagram showing the configuration of a compression coding apparatus according to the first embodiment of the present invention.

A compression procedure according to the present invention will be explained with reference to FIGS. 1 to 4. FIG. 1 is a block diagram showing a compression coding apparatus according to the first embodiment. Image data is compression-encoded on the basis of H.264.

In FIG. 1, image data is divided into macroblocks and then input, and a difference from a predicted value is obtained by a subtracter 101. The difference image undergoes integer DCT transform by a transformer 102 to acquire an integer DCT transform coefficient. The integer DCT transform coefficient is quantized by a quantizer 103. The quantized data is sent as difference image data to an entropy encoder 115. At the same time, the quantized data is also supplied to a dequantizer 104 and dequantized to acquire an integer DCT coefficient again. The coefficient undergoes inverse integer DCT transform by an inverse transformer 105 to obtain the abovementioned difference image. A predicted value is added to the difference image by an adder 106 to reconstruct an image. This image reconstruction is called local decoding, and the reconstructed image is called a locally decoded image. The reconstructed image is sent to a frame memory 107 for intra prediction. At the same time, the reconstructed image undergoes deblocking filter processing by a deblocking filter 109, and then supplied to a frame memory 110 for inter prediction.

An image stored in the frame memory 107 for intra prediction is used by an intra prediction circuit 108. In intra prediction, the value of an adjacent pixel of an encoded block in the same picture is used as a predicted value.

An image stored in the frame memory 110 for inter prediction is made up of a plurality of pictures, which will be described later. The pictures are classified into two reference lists List_0 and List_1, and used by an inter prediction circuit 111.

After prediction, pictures in the reference list are updated by a memory controller 113.

The inter prediction circuit 111 determines a predicted image using an optimal motion vector obtained by a motion detector 112 for image data of a different frame. As a result of intra prediction and inter prediction, an optimal prediction is selected by a switching circuit 114. A prediction mode (intra mode or inter mode) or a predicted vector is sent to the entropy encoder 115, and encoded together with difference image data to form an output bitstream.

Reference numeral 116 denotes an access counter which measures the count at which a motion vector is assigned to each reference picture in the frame memory 110 for inter prediction. The contents of the access counter 116 are used to update pictures by the memory controller 113.

In the first embodiment, the reference list is updated by measuring by the access counter the count at which each reference picture is used for prediction, deleting a picture of the lowest access frequency, and adding a new picture.

The reference list update procedure will be explained with reference to the flowchart of FIG. 2. The flowchart operation is controlled by a CPU or the like which is not shown in the block diagram of FIG. 1.

Figure 2:
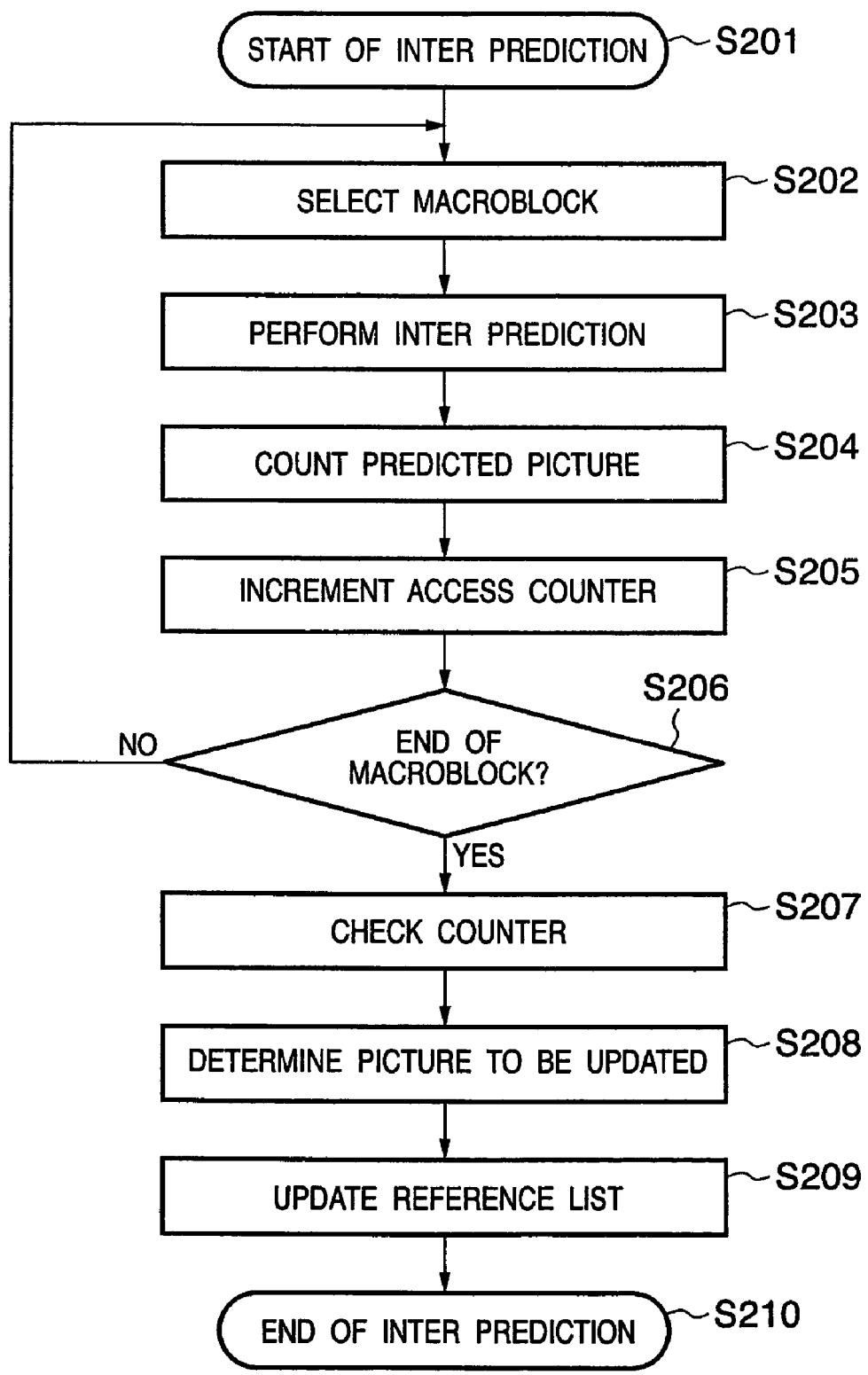
FIG. 2 is a flowchart for explaining an operation according to the first embodiment.

In step S202 of FIG. 2, the first macroblock subjected to inter prediction is selected. In step S203, motion detection is done for each reference picture to execute inter prediction.

In step S204, which of pictures is referred to is determined as a result of inter prediction. In step S205, an access counter corresponding to the picture is counted up.

In step S206, it is determined whether inter prediction processing and predicted-picture counting processing have been done for all macroblocks. If these processes end, the process shifts to step S207; if NO, returns to step S202 to execute the same processing for the next macroblock.

In step S207, the counter value of the access counter is checked after the end of inter prediction for all macroblocks. In step S208, a reference picture whose reference count is the lowest on the basis of the counter value is determined as a picture to be deleted in update.

In step S209, the reference picture determined in step S208 is deleted from List_0, and a new picture is added to the list to update the reference list.

A concrete example of counting of a reference picture will be explained.

As adopted in H.264, one macroblock is divided into macroblock partitions. A reference picture may change between divided macroblock partitions. In this case, the reference picture is counted in accordance with the area of the divided macroblock partition.

Figure 3:
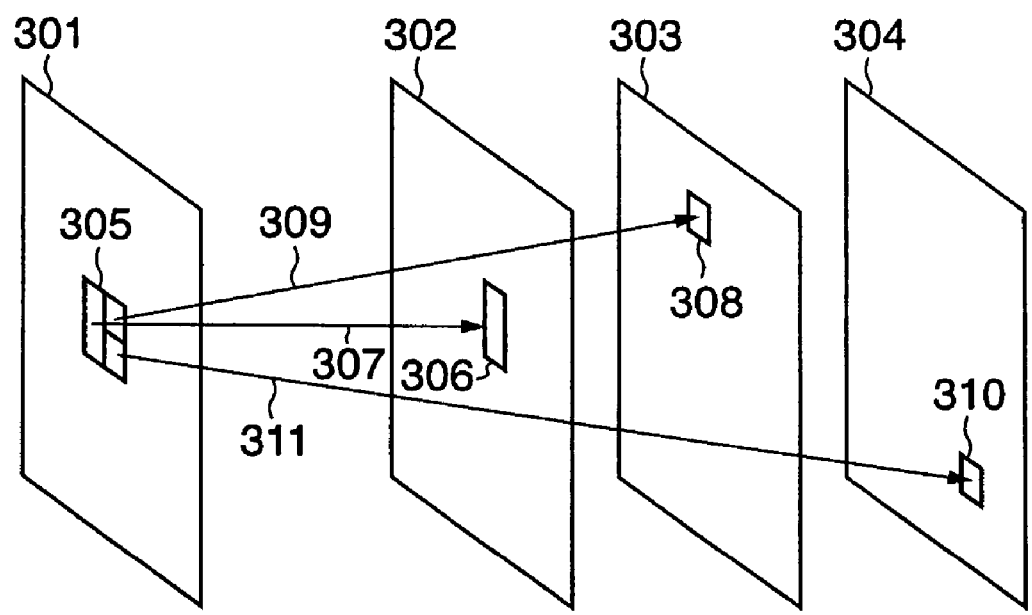
FIG. 3 is a view showing an example of how to process a macroblock partition.

Counting of a reference picture will be explained by exemplifying a case wherein reference pictures 302, 303, and 304 exist in the reference list for inter prediction of an image 301, a macroblock 305 is divided into blocks of 8×16 pixels, and one block is further divided into blocks of 8×8 pixels to execute prediction, as shown in FIG. 3.

For example, an 8×16 macroblock partition 306 is predicted from the reference picture 302 using a motion vector 307. An 8×8 macroblock 308 is predicted from the reference picture 303 using a motion vector 309. An 8×8 macroblock 310 is predicted from the reference picture 304 using a motion vector 311. In this case, the count value of each reference picture is 0.5 for the reference picture 302, 0.25 for the reference picture 303, and 0.25 for the reference picture 304. Alternatively, the 8×8 macroblock partition may be defined as a reference to set the count value to 2 for the reference picture 302, 1 for the reference picture 303, and 1 for the reference picture 304. How to update a reference picture in the first embodiment will be described with reference to FIG. 4.

Figure 4:
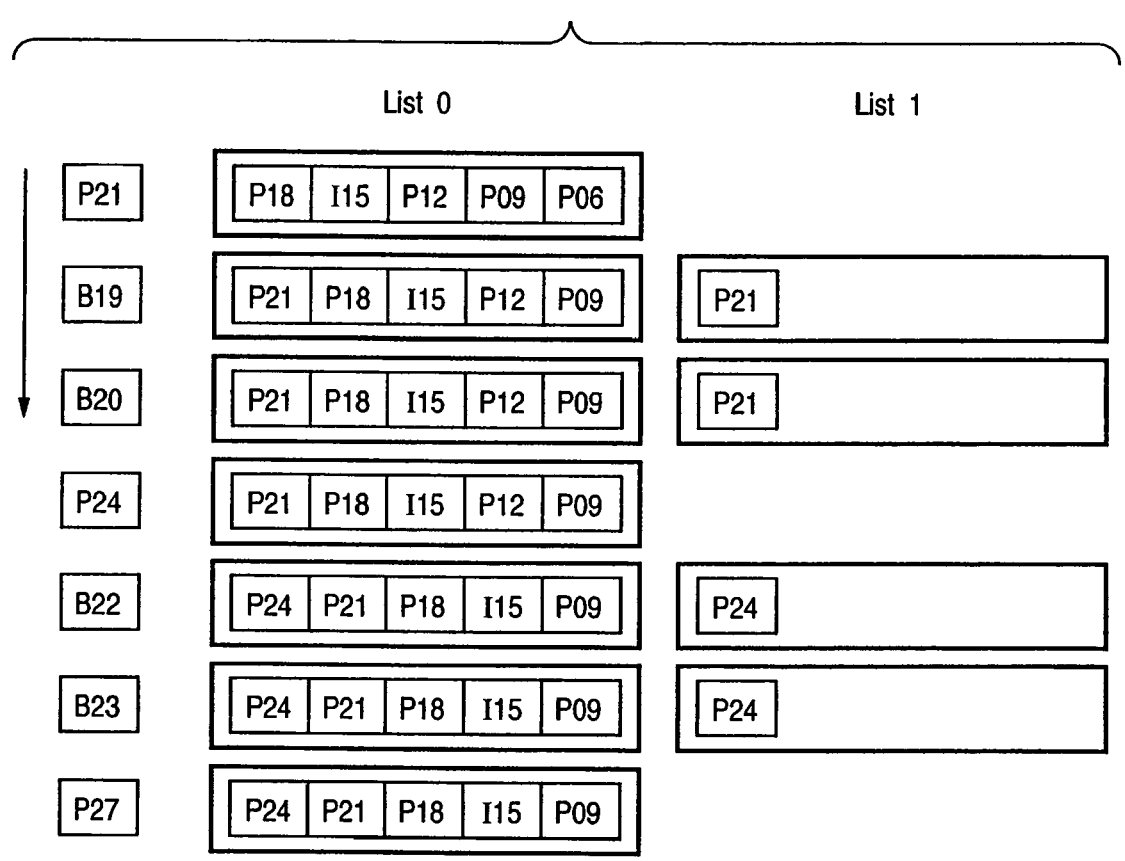
FIG. 4 is a view showing update of a reference list according to the first embodiment.

In FIG. 4, the oldest reference picture is deleted until inter prediction of a picture P24 is done. When a picture P21 undergoes inter prediction, a reference picture P06 whose reference frequency is the lowest is deleted from List_0.

Also in FIG. 4, the reference frequency of P12 is the lowest as a result of checking the reference frequency of each reference picture by the access counter after inter prediction of the picture P24 is performed.

Since the reference frequency of P12 is the lowest, not the oldest picture P09 in the reference list but P12 is deleted from the list, and the encoded picture P24 is newly added as a reference picture in updating reference pictures after inter prediction of P24.

According to the first embodiment, the reference list is updated by measuring by the access counter the count at which each reference picture is used for prediction, preferentially deleting a picture of the lowest access frequency, and adding a new picture (predicted picture). An optimal reference list can always be maintained, and the compression coding efficiency can be increased by efficient inter prediction.

Second Embodiment

The second embodiment will be explained with reference to FIGS. 5 and 6. The configuration of a compression coding apparatus according to the second embodiment is the same as that according to the first embodiment, and a detailed description thereof will be omitted.

The second embodiment is different from the first embodiment in that, when the reference list is to be updated, the count at which each reference picture is used for prediction is measured by an access counter, and a reference picture of especially a high access count is changed to a long-term reference picture.

Processing according to the second embodiment will be explained with reference to the flowchart of FIG. 5.

Figure 5:
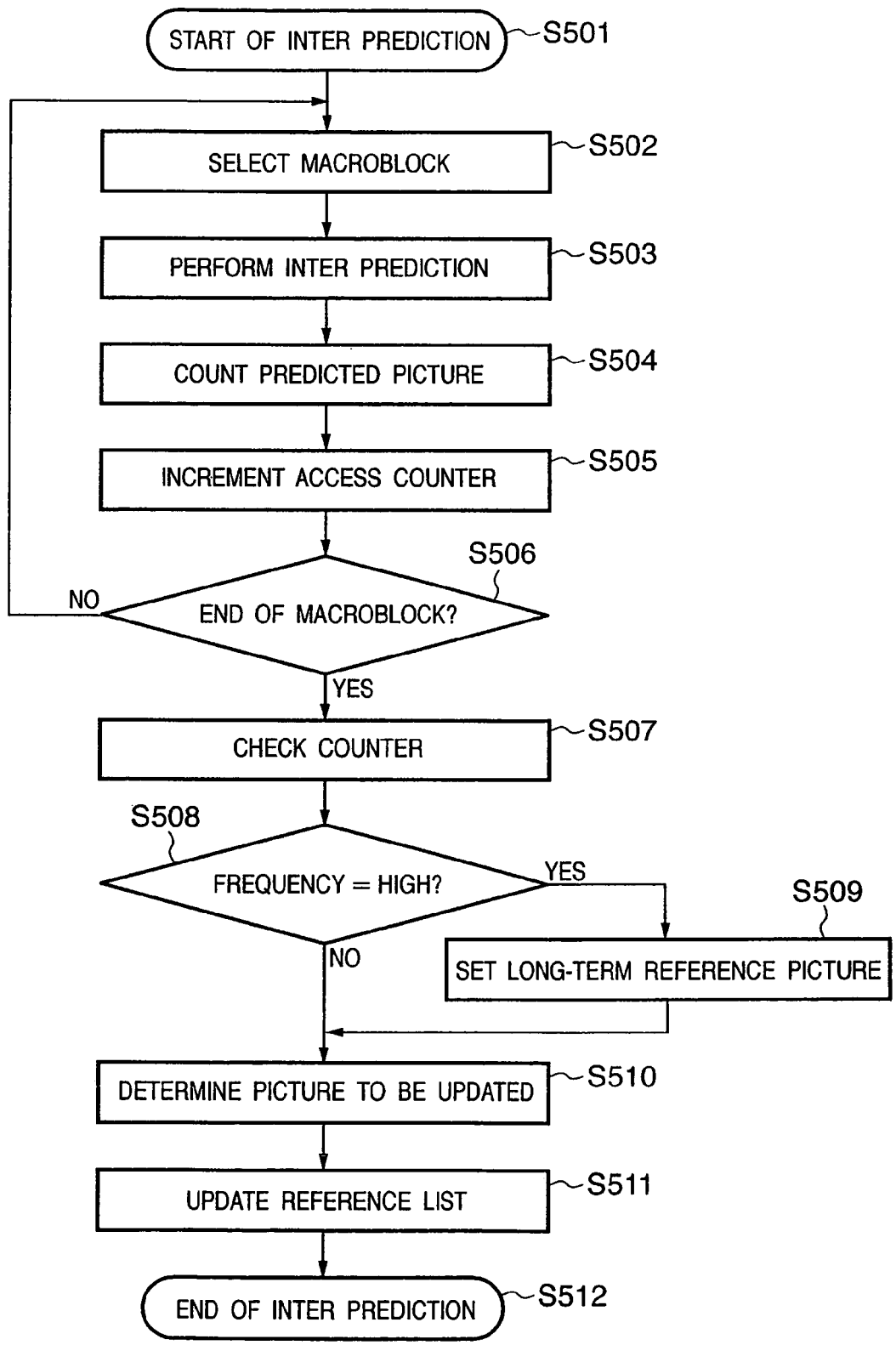
FIG. 5 is a flowchart for explaining an operation according to the second embodiment.

In step S502 of FIG. 5, the first macroblock subjected to inter prediction is selected. In step S503, motion detection is done for reference pictures to execute inter prediction.

In step S504, which of pictures is referred to is determined as a result of inter prediction. In step S505, an access counter corresponding to the picture is counted.

In step S506, it is determined whether inter prediction processing and predicted-picture counting processing have been done for all macroblocks. If these processes end, the process shifts to step S507; if NO, returns to step S502 to execute the same processing for the next macroblock.

In step S507, the counter value of the access counter is checked after the end of inter prediction for all macroblocks.

In step S508, it is determined whether a reference picture whose reference frequency is equal to or higher than a predetermined value exists among reference pictures in List_0. If a picture whose reference frequency is equal to or higher than the predetermined value exists, the process shifts to step S509. If a picture whose reference frequency is equal to or higher than the predetermined value does not exist, the process shifts to step S510.

In step S509, the attribute of the reference picture is changed from a short-term reference picture to a long-term one. With this setting, the compression efficiency can be increased while coping with even a special case wherein a specific picture is old but has a high reference frequency.

In step S510, a reference picture whose reference count is the lowest on the basis of the counter value checked in step S507 is determined as a picture to be deleted in update. Then, a new picture is added to List_0.

Note that the reference frequency of the set long-term reference picture is subsequently measured by the access counter, and if the reference frequency decreases from a predetermined value, the long-term reference picture is deleted in updating the reference list. If the scene changes, even the long-term reference picture may be forcibly deleted in update.

Figure 6:
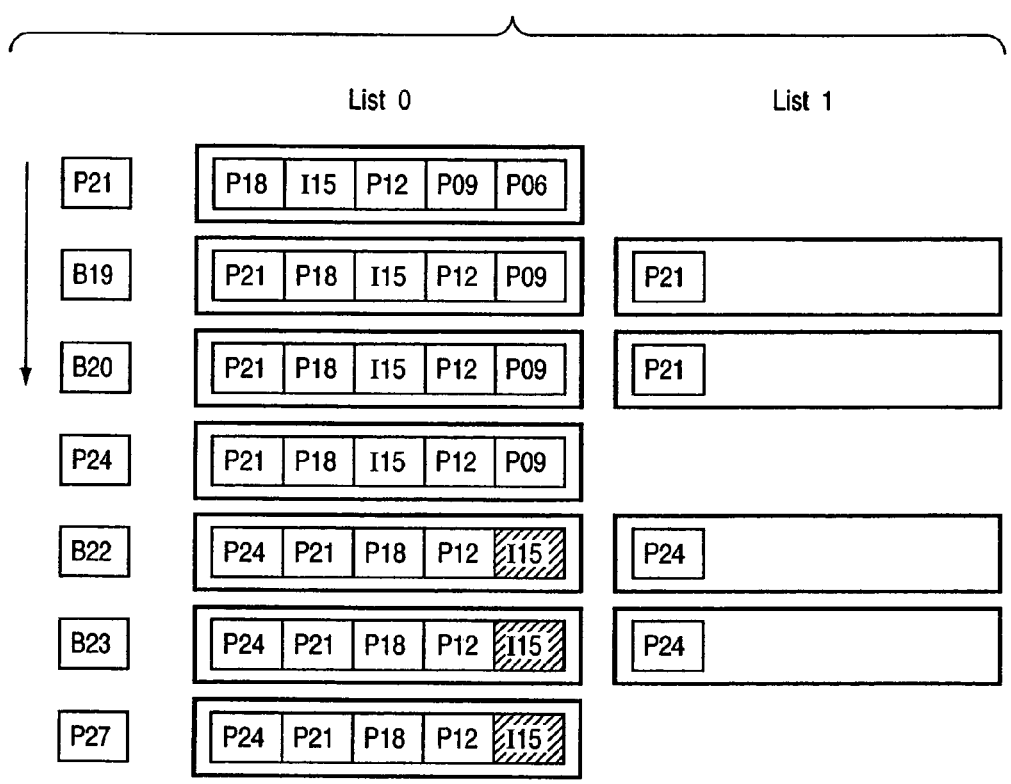
FIG. 6 is a view showing update of a reference list according to the second embodiment.
Figure 7:
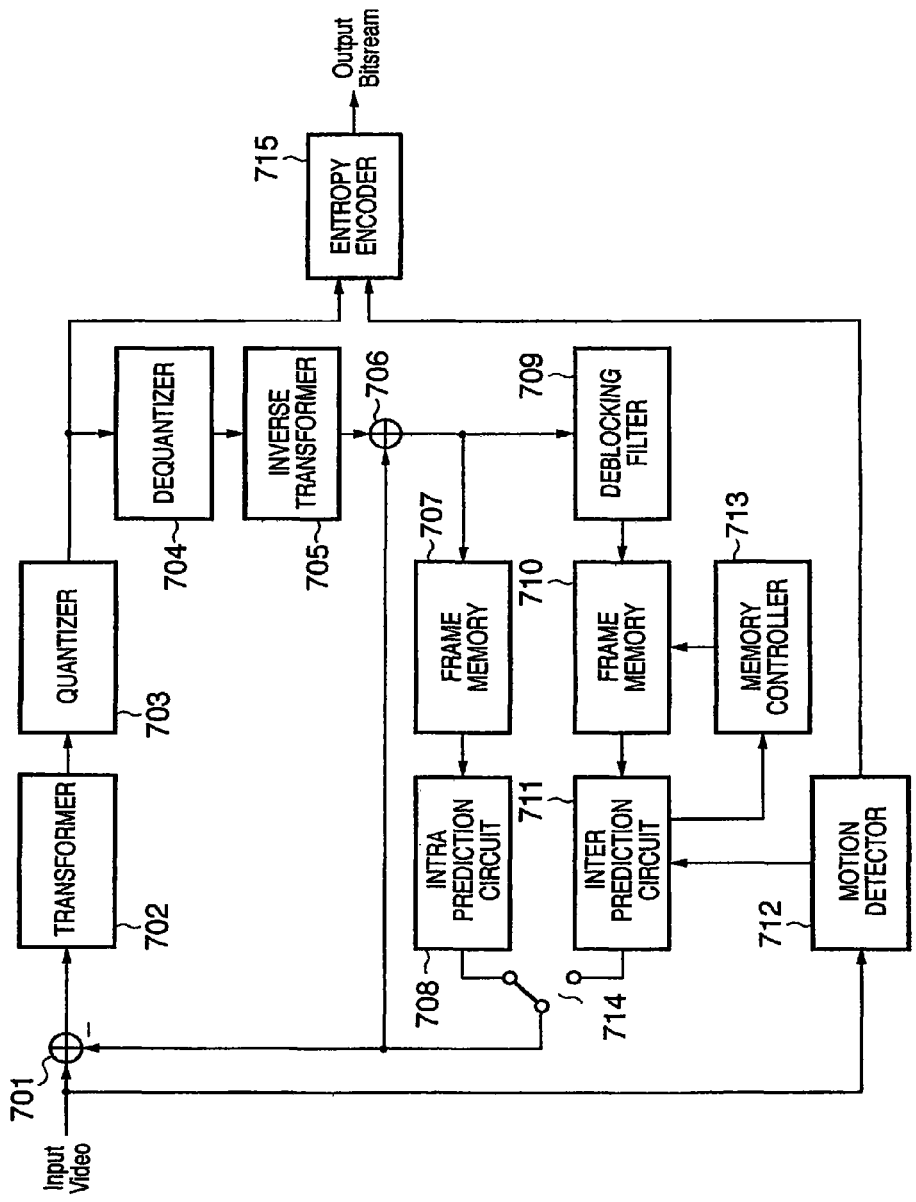
FIG. 7 is a block diagram showing the configuration of a general compression coding apparatus complying with H.264.
Figure 8:
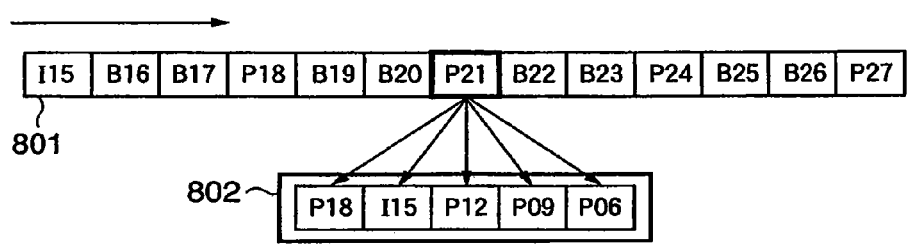
FIG. 8 is a view for explaining conventional reference list 1.
Figure 9:
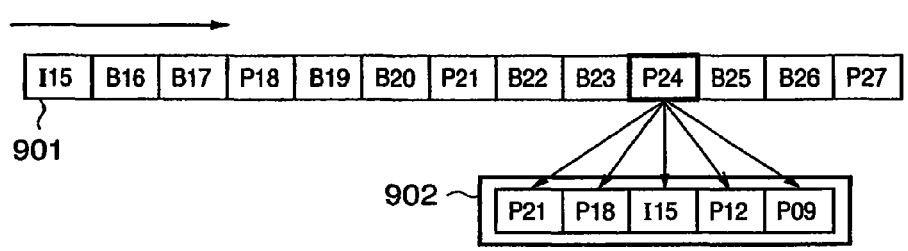
FIG. 9 is a view for explaining conventional reference list 2.
Figure 10:
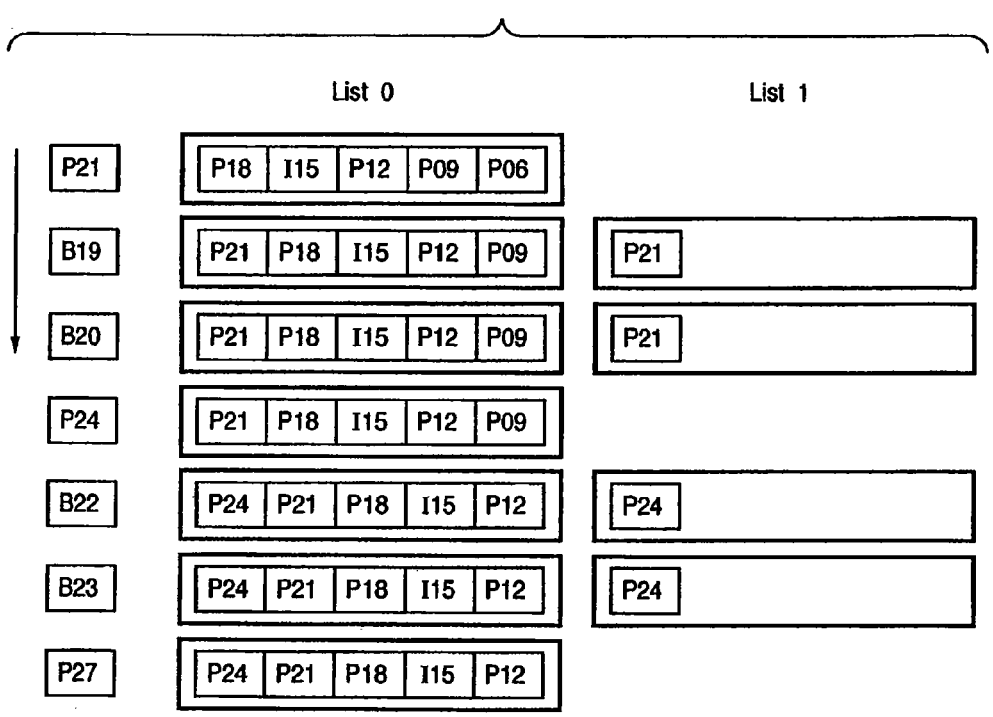
FIG. 10 is a view showing update of a general reference list.
Figure 11:
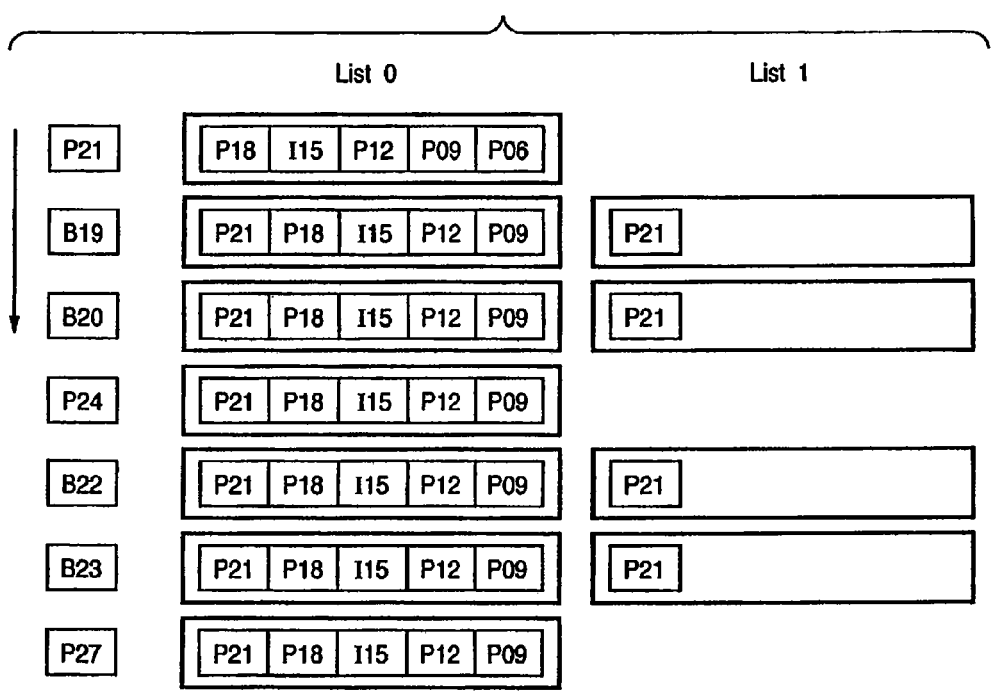
FIG. 11 is a view showing an example of update of a conventional reference list.
Figure 12:
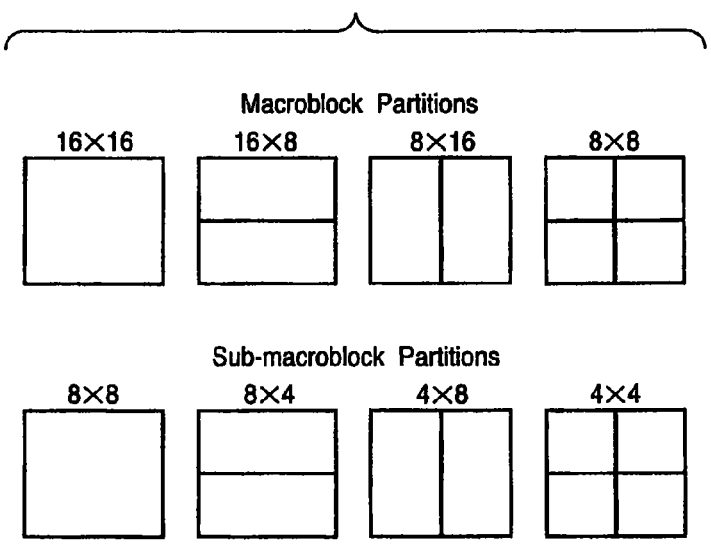
FIG. 12 is a view showing a general macroblock partition.
Figure 13:
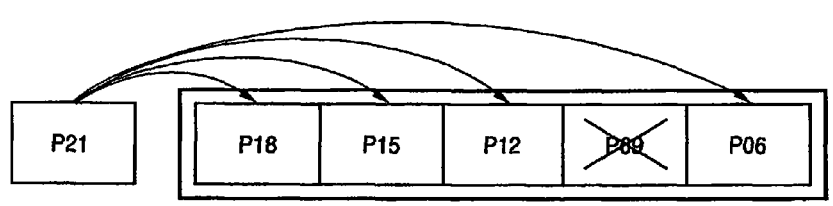
FIG. 13 is a conceptual view showing another example of update of the conventional reference list.

FIG. 6 is a conceptual view showing how to update a reference picture according to the second embodiment.

In FIG. 6, the reference frequency of 115 is particularly high as a result of checking the reference frequency of a reference picture by the access counter after inter prediction of a picture P24.

In FIG. 6, the oldest reference picture is deleted until inter prediction of the picture P24 is done. When a picture P21 undergoes inter prediction, a reference picture P06 whose reference frequency is the lowest is deleted from List_0.

Also in FIG. 4, the reference frequency of 115 is especially high (i.e., 115 is referred to at a predetermined count or more) when inter prediction of the picture P24 is performed. In updating reference pictures after inter prediction of P24, 115 is newly designated as a long-term reference picture (hatched portion in FIG. 6). The oldest picture P09 in the reference list is deleted from the list, and the encoded picture P24 is newly added as a reference picture.

According to the second embodiment, in updating the reference list, the count at which each reference picture is used for prediction is measured by the access counter, and a reference picture of especially a high access count is changed to a long-term reference picture. An optimal reference list can always be maintained, and the compression coding efficiency can be increased by efficient inter prediction.

As has been described above, according to the first and second embodiments, the reference count is measured, and the reference list is updated in accordance with the reference count. A picture whose reference count is high remains in the reference list, increasing the coding efficiency of inter prediction.

Other Embodiment

The present invention is achieved even by supplying a storage medium which records software program codes to implement the functions of the above-described embodiments to the system or apparatus and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. As the storage medium to supply the program codes, for example, a Floppy® disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the OS (operating system) or the like running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The functions of the above-described embodiments are also achieved by distributing, via a network, software program codes to implement the functions of the above-described embodiments, storing them in a storage means such as the hard disk or memory of the system or apparatus or a storage medium such as a CD-RW or CD-R, and causing the computer (or CPU or MPU) of the system or apparatus to read out and execute the program codes stored in the storage means or storage medium.

The present invention is not limited to the above embodiments and various changes and modifications can be made within the spirit and scope of the present invention. Therefore, to apprise the public of the scope of the present invention the following claims are made.

This application claims the benefit of Japanese Application No. 2005-026881, filed Feb. 2, 2005, which is hereby incorporated by reference herein in its entirety.

What is claimed is:

1. An image processing apparatus which performs predictive coding using image data of a different frame as a reference picture, comprising:
   prediction means for performing motion compensated prediction for each reference picture in at least one reference list formed from a set of reference pictures for prediction;
   reference list update means for updating the reference list by adding or deleting the reference picture;
   reference counter means for measuring, for each reference picture, a count at which the reference picture is used for motion compensation predictive coding; and
   update picture determination means for determining a reference picture to be updated in the reference list by using a measurement result of said reference counter means,
   wherein for image data representing a value by said reference counter means that is larger than a predetermined value, said update picture determination means changes an attribute of a reference picture from a short-term reference picture to a long-term reference picture.

2. The apparatus according to claim 1, wherein said update picture determination means determines, as image data to be updated, image data representing the smallest value among values in said reference counter means.

3. The apparatus according to claim 1, wherein when the value by said reference counter means for the attribute corresponding to the long-term reference picture is smaller than the predetermined value, said update picture determination means determines the long-term reference picture as image data to be updated.

4. The apparatus according to claim 1, wherein said reference counter means measures a use count of each macroblock to be referred to.

5. The apparatus according to claim 4, wherein when the macroblock to be referred to is subdivided and referred to, said reference counter means uses a value corresponding to a subdivision size of the macroblock for counting.

6. The apparatus according to claim 4, wherein when the macroblock to be referred to is subdivided and referred to, said reference counter means uses an integer value corresponding to a subdivision size ratio of the macroblock for counting.

7. An image processing method of performing predictive coding using image data of a different frame stored in a frame memory as a reference picture, comprising:
   a prediction step that a predictor performs motion compensated prediction for each reference picture in at least one reference list formed from a set of reference pictures for prediction;

a measurement step that a counter measures, for each reference picture, a count at which the reference picture is used for motion compensated prediction;

an update picture determination step that a controller determines a reference picture to be updated from the reference list by using a measurement result in the measurement step; and a reference list update step that the frame memory updates the reference picture in the reference list on the basis of a determination result in the update picture determination step, wherein in the update picture determination step, for image data representing a measurement value in the measurement step that is larger than a predetermined value, an attribute of a reference picture is changed from a short-term reference picture to a long-term reference picture.

8. The method according to claim 7, wherein in the update picture determination step, image data representing the smallest value among measurement values in the measurement step is determined as image data to be updated.

9. The method according to claim 7, wherein in the update picture determination step, when the measurement value for the attribute corresponding to the long-term reference picture is smaller than the predetermined value, the long-term reference picture is determined as image data to be updated.

10. The method according to claim 7, wherein in the measurement step, a use count of each macroblock to be referred to is measured.

11. The method according to claim 10, wherein in the measurement step, when the macroblock to be referred to is subdivided and referred to, a value corresponding to a subdivision size of the macroblock is used for counting.

12. The method according to claim 10, wherein in the measurement step, when the macroblock to be referred to is subdivided and referred to, an integer value corresponding to a subdivision size ratio of the macroblock is used for counting.

13. An image processing apparatus which performs predictive coding using image data of a different frame as a reference picture, comprising:

a frame memory which can store a plurality of locally decoded images of an encoded image as reference pictures;

a memory controller which, when a reference picture to be stored in said frame memory is added to said frame memory, deletes another reference picture stored in said frame memory;

a motion compensated predictor which performs motion compensated prediction of each macroblock by selectively using a reference picture stored in said frame memory for each macroblock;

an encoder which encodes image data obtained by the motion compensated prediction; and a counter which measures, for each reference picture stored in said frame memory, a count at which the reference picture is used for the motion compensated prediction, wherein said memory controller determines a reference picture to be deleted in accordance with a count value of each reference picture that is measured by said counter, and wherein for image data representing the count value that is larger than a predetermined value, said memory controller changes an attribute of a reference picture from a short-term reference picture to a long-term reference picture and holds the long-term reference picture in said frame memory.

\* \* \* \* \*